United States Patent
Frese et al.

(10) Patent No.: US 10,260,421 B2
(45) Date of Patent: Apr. 16, 2019

(54) FIBROUS MEDIA DRIFT ELIMINATOR

(71) Applicant: General Electric Company, Schenectady, NY (US)

(72) Inventors: Christopher Conrad Frese, Greenville, SC (US); Naveen Ghattadhahalli Parmeshwar, Greenville, SC (US); Hua Zhang, Greer, SC (US); Valery Ivanovich Ponyavin, Greenville, SC (US); Bradly Aaron Kippel, Greer, SC (US)

(73) Assignee: General Electric Company, Schenectady, NY (US)

( * ) Notice: Subject to any disclaimer, the term of this patent is extended or adjusted under 35 U.S.C. 154(b) by 30 days.

(21) Appl. No.: 15/463,885

(22) Filed: Mar. 20, 2017

(65) Prior Publication Data

US 2018/0266321 A1 Sep. 20, 2018

(51) Int. Cl.
| | | |
|---|---|---|
| *F02C 7/143* | (2006.01) | |
| *F02C 7/04* | (2006.01) | |
| *F04D 29/58* | (2006.01) | |
| *F02C 7/05* | (2006.01) | |

(52) U.S. Cl.
CPC .............. *F02C 7/1435* (2013.01); *F02C 7/04* (2013.01); *F02C 7/05* (2013.01); *F02C 7/143* (2013.01); *F04D 29/5826* (2013.01); *F04D 29/5846* (2013.01); *F05D 2220/32* (2013.01); *F05D 2250/61* (2013.01); *F05D 2260/232* (2013.01); *F05D 2260/602* (2013.01); *F05D 2300/614* (2013.01)

(58) Field of Classification Search
CPC .... F02C 7/04; F02C 7/05; F02C 7/143; F02C 7/1435; F04D 29/5826; F04D 29/5846; F05D 2220/32; F05D 2250/61; F05D 2260/232; F05D 2300/614; F05D 2260/602
USPC ................................. 261/103, 106, DIG. 43
See application file for complete search history.

(56) References Cited

U.S. PATENT DOCUMENTS

| | | | |
|---|---|---|---|
| 8,662,150 B2 | 3/2014 | Kippel | |
| 8,950,200 B2 * | 2/2015 | Townsend | F25B 39/04 62/305 |
| 9,359,914 B2 * | 6/2016 | Zhang | F01D 25/12 |
| 9,551,282 B2 * | 1/2017 | Zhang | C04B 35/565 |
| 2005/0120688 A1 * | 6/2005 | Shepherd | B01D 45/06 55/440 |
| 2005/0268787 A1 * | 12/2005 | Johnson | B01D 47/06 96/297 |
| 2009/0294548 A1 | 12/2009 | Geiger | |
| 2013/0000329 A1 * | 1/2013 | Smith | F02C 1/04 62/91 |
| 2014/0123674 A1 | 5/2014 | Hao | |
| 2014/0144171 A1 * | 5/2014 | Smith | F28F 25/04 62/304 |
| 2015/0121881 A1 | 5/2015 | Zhang | |
| 2015/0315970 A1 | 11/2015 | John | |

(Continued)

*Primary Examiner* — Charles S Bushey
(74) *Attorney, Agent, or Firm* — Eversheds Sutherland (US) LLP

(57) ABSTRACT

The present application provides an inlet air system for cooling an inlet air flow to a compressor of a gas turbine engine. The inlet air system may include a wetted media pad and a drift eliminator positioned downstream of the wetted media pad with an air gap therebetween. The drift eliminator may include a fibrous media pad.

19 Claims, 6 Drawing Sheets

(56) References Cited

U.S. PATENT DOCUMENTS

| | | |
|---|---|---|
| 2015/0322865 A1 | 11/2015 | Scipio |
| 2015/0377569 A1 | 12/2015 | Zhang |
| 2016/0053637 A1 | 2/2016 | Zhang |
| 2016/0108816 A1 | 4/2016 | Zhang |
| 2016/0146043 A1 | 5/2016 | Zhang |
| 2017/0276386 A1* | 9/2017 | Ponyavin ................. F24F 6/04 |
| 2018/0266317 A1* | 9/2018 | Zhang .................... F02C 7/055 |
| 2018/0266322 A1* | 9/2018 | Zhang ...................... F02C 7/16 |
| 2018/0266323 A1* | 9/2018 | Zhang ...................... F28C 3/08 |

* cited by examiner

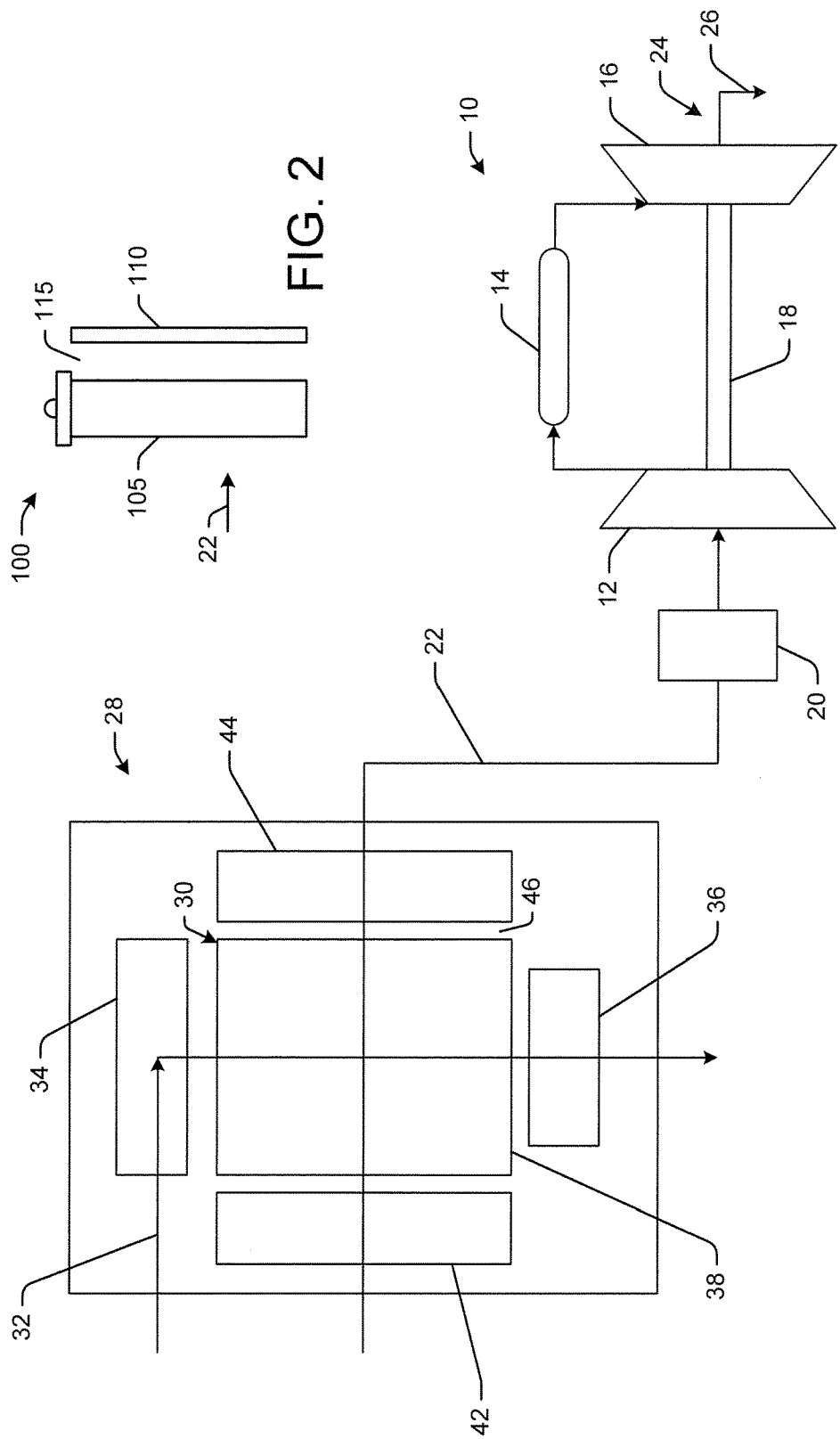

FIBROUS MEDIA DRIFT ELIMINATOR

TECHNICAL FIELD

The present application and the resultant patent relate generally to gas turbine engines and more particularly relate to a drift eliminator made from a fibrous media for improved water droplet evaporation with greater evaporative cooling efficiency.

BACKGROUND OF THE INVENTION

A conventional gas turbine engine includes a compressor for compressing a flow of ambient air, a combustor for mixing the compressed flow of ambient air with a flow of fuel to create a flow of hot combustion gases, and a turbine that is driven by the hot combustion gases to produce mechanical work. The turbine may drive a load such as a generator for electrical power. Various strategies are known for increasing the amount of power that a gas turbine engine may be able to produce. One method of increasing the power output is by cooling the ambient air flow upstream of the compressor. Such cooling may cause the air flow to have a higher density, thereby creating a higher mass flow rate into the compressor. The higher mass flow rate into the compressor allows more air to be compressed so as to allow the gas turbine engine to produce more power. Moreover, cooling the ambient air flow generally may increase the overall efficiency of the gas turbine engine in hot environments.

Various systems and methods may be utilized to cool the ambient air flow entering the gas turbine engine. For example, inlet air systems with one or more heat exchangers may be used to cool the ambient air flow through latent cooling or through sensible cooling. Such heat exchangers often may utilize a wetted media pad to facilitate the cooling of the ambient air flow. These wetted media pads may allow heat and/or mass transfer between the ambient air flow and a coolant flow such as a flow of water. The ambient air flow interacts with the coolant flow in the wetted media pad for heat exchange therewith.

The airflow passages through such wetted media pads are intended to provide effective water evaporation and mixing of the flow of ambient air with the water vapor from the flow of water. As the air velocity increases, however, water shedding may occur. Specifically, airborne water droplets may accumulate in a downstream inlet duct and/or flow into the compressor. Such water droplets may cause blade abrasion and other types of damage. Known inlet air system thus may incorporate an evaporative cooling system with a downstream drift eliminator. Such drift eliminators, however, may require both significant space and additional materials. Specifically, common drift eliminators may include a number of thermoplastic components positioned at an angle. Moreover, such drift eliminators generally require routine maintenance and associated downtime. Known systems also add may increase overall pressure losses which may reduce overall gas turbine output.

SUMMARY OF THE INVENTION

The present application and the resultant patent thus provide an inlet air system for cooling an inlet air flow to a compressor of a gas turbine engine. The inlet air system may include a wetted media pad and a drift eliminator positioned downstream of the wetted media pad with an air gap therebetween. The drift eliminator may include a fibrous media pad in whole or in part.

The present application and the resultant patent further provide a method of cooling an inlet air flow for a gas turbine engine. The method may include the steps of positioning a wetted media pad about an inlet of the gas turbine engine, flowing water from a top to a bottom of the wetted media pad, exchanging heat between the inlet air flow and the flow of water, positioning a fibrous media drift eliminator downstream of the wetter media pad with an air gap therebetween, and capturing water droplets flowing downstream of the wetted media pad in the fibrous media drift eliminator.

The present application and the resultant patent further provide an inlet air system for cooling an inlet air flow to a compressor of a gas turbine engine. The inlet air system may include a wetted media pad and a drift eliminator positioned downstream of the wetted media pad with an air gap therebetween. The drift eliminator may include a fibrous media pad in whole or in part having a first media sheet with a number of chevron channels and a second media sheet having a number of wavy channels.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 1 is a schematic diagram of a gas turbine engine with an inlet air system.

FIG. 2 is a schematic diagram of an inlet air system as may be described herein.

DETAILED DESCRIPTION

Figure 3:
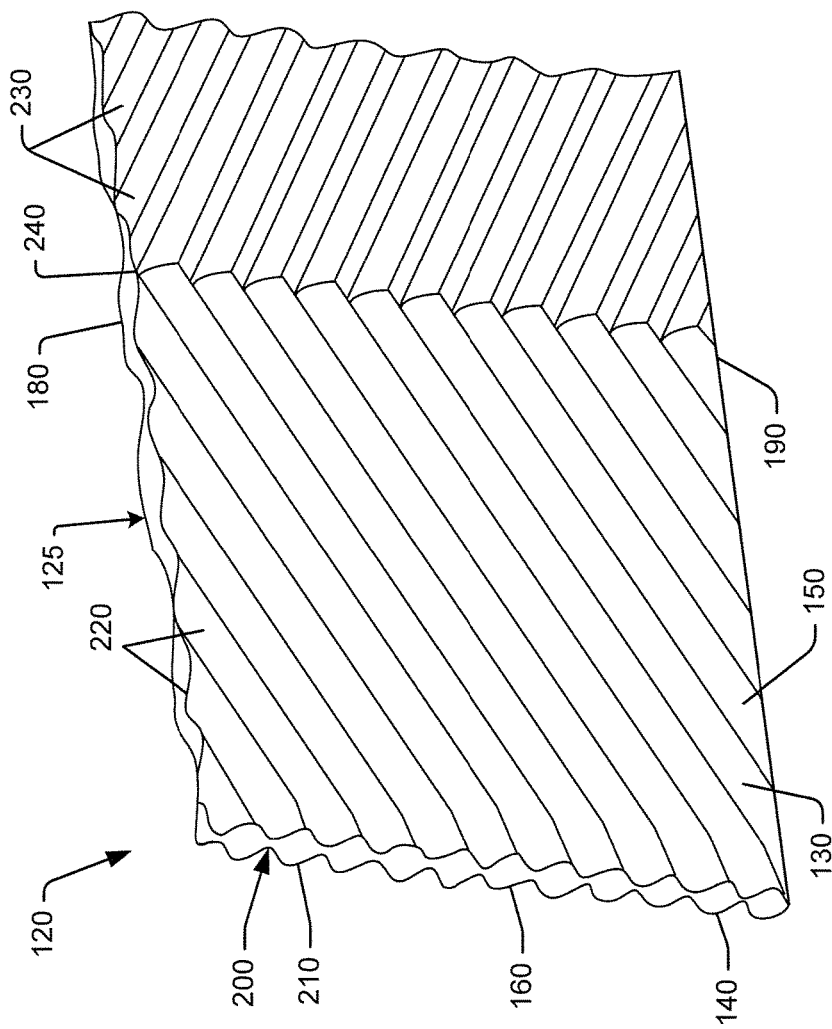
FIG. 3 is a perspective view of a first side of a fibrous media pad that may be used with the inlet air system of FIG. 2.

Referring now to the drawings, in which like numerals refer to like elements throughout the several views, FIG. 1 is a schematic diagram of an example of a gas turbine engine 10. The gas turbine engine 10 may include a compressor 12, a combustor 14, and a turbine 16. Although only a single combustor 14 is shown, any number of the combustors 14 may be used herein and positioned in a circumferential array and the like. The compressor 12 and the turbine 16 may be coupled by a shaft 18. The shaft 18 may be a single shaft or a number of shaft segments coupled together. The shaft 18 also may drive a load such as a generator and the like.

The gas turbine engine 10 further may include a gas turbine air inlet 20. The air inlet 20 may be configured to accept an inlet air flow 22. For example, the air inlet 20 may be in the form of a gas turbine inlet house and the like. Alternatively, the air inlet 20 may be any portion of the gas turbine engine 10, such as any portion of the compressor 12 or any apparatus upstream of the compressor 12 which may accept the inlet air flow 22. The inlet air flow 22 may be ambient air and may be conditioned or unconditioned.

The gas turbine engine 10 further may include an exhaust outlet 24. The exhaust outlet 24 may be configured to discharge a gas turbine exhaust flow 26. The exhaust flow 26 may be directed to a heat recovery steam generator (not shown). Alternatively, the exhaust flow 26 may be, for example, directed to an absorption chiller (not shown) to chill a flow of water, directed to a waste heat recovery unit (not shown), directed to a desalination plant, or dispersed into the ambient air in whole or in part.

The gas turbine engine 10 further may include an inlet air system 28 with one or more heat exchangers 30. The inlet air system 28 may be configured to cool the inlet air flow 22 before entry into the compressor 12. For example, the inlet air system 28 may be disposed about the gas turbine air inlet 20. Alternatively, the inlet air system 28 may be upstream or downstream of the gas turbine inlet 20. The inlet air system 28 may allow the inlet air flow 22 and a heat exchange medium such as a flow of water 32 to exchange heat in the heat exchanger 30. The heat exchange medium also may be any suitable type of fluid flow. The heat exchanger 30 thus may facilitate the interaction of the inlet air flow 22 and the flow of water 32 therein so as to cool the inlet air flow 22 before entering the compressor 12.

The heat exchanger 30 may be a direct contact type heat exchanger 30. The heat exchanger 30 may include a heat exchange medium inlet 34, a heat exchange medium outlet 36, and a wetted media pad 38 therebetween. The flow of water 32 or other type of heat exchange medium may flow through the heat exchange medium inlet 34 to the wetted media pad 38. The heat exchange medium inlet 34 may include a nozzle, a number of nozzles, a manifold with an orifice or a number of orifices, and the like. The heat exchange medium outlet 36 may accept the flow of water 32 exhausted from the wetted media pad 38. The heat exchange medium outlet 36 may be a sump disposed downstream of the media pad 38 in the direction of the flow of water 32. The flow of water 32 may be directed in a generally or approximately downward direction from the heat exchange medium inlet 34 through the wetted media pad 38 while the inlet air flow 22 may be directed through the heat exchanger 30 in a direction generally or approximately perpendicular to the direction of the flow of water 32. Other types of counter or cross flow arrangements also may be used.

A filter 42 may be disposed upstream of the wetted media pad 38 in the direction of inlet air flow 22. The filter 42 may be configured to remove particulates from the inlet air flow 22 so as to prevent the particulates from entering into the gas turbine engine 10. Alternatively, the filter 42 may be disposed downstream of the wetted media pad 38 in the direction of inlet air flow 22. A drift eliminator 44 may be disposed downstream of the wetted media pad 38 in the direction of inlet air flow 22. The drift eliminator 44 may act to remove droplets of the flow of water 32 from the inlet air flow 22 before the inlet air flow 22 enters the compressor 12. As described above, the drift eliminator 44 may include a number of thermoplastic components positioned at an angle downstream of the media pad 38 and the like. The angle changes the direction of the airstream to separate the water droplets therein. The wetted media pad 38 and the drift eliminator 44 may be separated by a gap 46. The length of the gap 46 may vary.

The heat exchanger 30 may be configured to cool the inlet air flow 22 through latent or evaporative cooling. Latent cooling refers to a method of cooling where heat is removed from a gas, such as air, so as to change the moisture content of the gas. Latent cooling may involve the evaporation of a liquid at approximate ambient wet bulb temperature to cool the gas. Specifically, latent cooling may be utilized to cool a gas to near its wet bulb temperature. Alternatively, the heat exchanger 30 may be configured to chill the inlet air flow 22 through sensible cooling. Sensible cooling refers to a method of cooling where heat is removed from a gas, such as air, so as to change the dry bulb and wet bulb temperatures of the air. Sensible cooling may involve chilling a liquid and then using the chilled liquid to cool the gas. Specifically, sensible cooling may be utilized to cool a gas to below its wet bulb temperature.

It should be understood that latent cooling and sensible cooling are not mutually exclusive cooling methods. Rather, these methods may be applied either exclusively or in combination. It should further be understood that the heat exchanger 30 described herein is not limited to latent cooling and sensible cooling methods, but may cool, or heat, the inlet air flow 22 through any suitable cooling or heating method as may be desired.

FIG. 2 show an example of an inlet air system 100 as may be described herein. In this example, the inlet air system 100 may include a wetted media pad 105 and a downstream drift eliminator 110. The wetted media pad 105 and the drift eliminator 110 may be separated by a gap 115. The length of the gap 115 may vary. The wetted media pad 105 and/or the drift eliminator 110 may be made out of a fibrous media pad 120 in whole or in part. The wetted media pad 105 and the drift eliminator 110 may have any suitable size, shape, or configuration. Other components and other configurations may be used herein.

Figure 4:
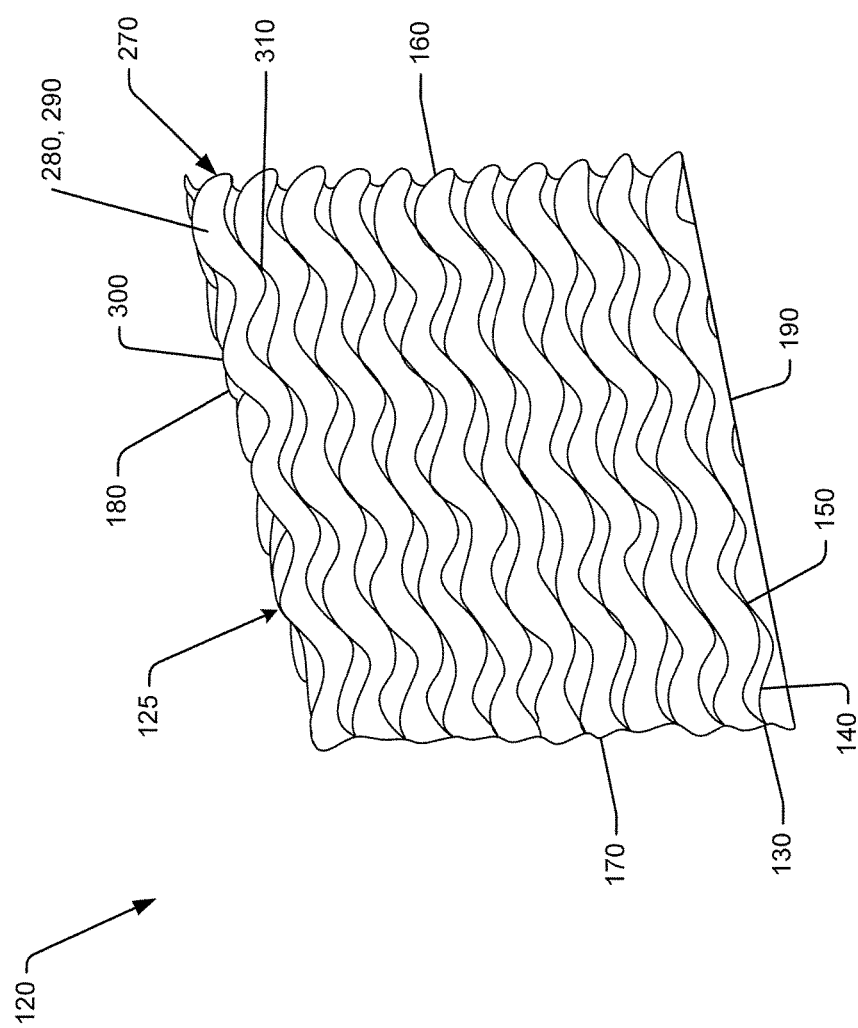
FIG. 4 is a perspective view of a second side of the fibrous media pad of FIG. 3.
Figure 5:
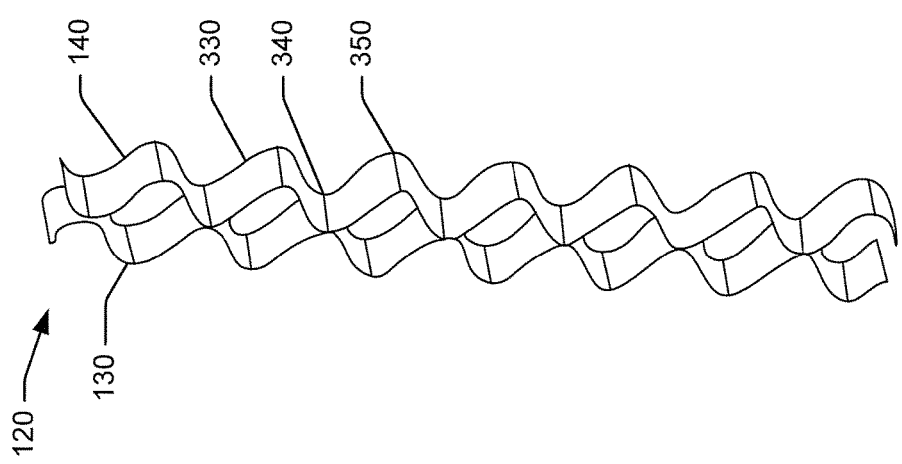
FIG. 5 is a side view of the fibrous media pad of FIG. 3.

As is shown in FIGS. 3-5, the fibrous media pad 120 may include at least a pair of media sheets 125 therein. In this example a first media sheet 130 and a second media sheet 140 are shown although additional sheets may be used herein. Any number of the media sheets 125 may be used herein in any suitable size, shape, or configuration. The media sheets 125 may be thermally formed from non-woven synthetic fibers with or without hydrophilic surface enhancements. For example, the non-woven synthetic fibers may include polyethylene terephthalate (PET), polytrimethylene terephthalate (PTT), nylon, polyester, polypropylene, and the like. The hydrophilic surface enhancements may include the application of a strong alkaline treatment under high processing temperatures, polyvinyl alcohol in an alkaline medium, and the like. Other materials and treatments may be used herein. The media sheets 125 may be wettable so as to accept, absorb, flow, and distribute the flow of water 32 or other type of heat exchange medium through the surface area thereof. The media sheets 125 may be utilized with different types of heat exchange mediums.

Generally described, the media sheets 125 may have a substantially three dimensional contoured shape 150. Specifically, the media sheets 125 may include a leading edge 160 facing the incoming inlet air flow 22 and a downstream trailing edge 170 facing about the compressor 12. Likewise, the media sheets 125 may have a top edge 180 for receiving the flow of water 32 and a downstream bottom edge 190 positioned about a drain and the like.

In this example, the first media sheet 130 may have a chevron like corrugated surface 200. The chevron like corrugated surface 200 may have a number of chevron channels 210 therein. Any number of the chevron channels 210 may be used herein in any suitable size, shape, or configuration. Specifically, the chevron channels 210 may have a diagonally rising portion 220 and a diagonally lowering portion 230. The diagonally rising portion 220 may extend from the leading edge 160 and meet the diagonally lowering portion 230 about an apex 240 thereof. The angle of the rising and the lowering portions may vary.

The second media sheet 140 may have a wavy corrugated surface 270. Specifically, the wavy corrugated surface 270 may have a number of wavy channels 280. Any number of the wavy channels 280 may be used herein in any size, shape, or configuration. Specifically, the wavy channels 280 may have a substantially sinusoidal like shape 290 with a number of peaks 300 and valleys 310. Other components and other configurations may be used herein.

FIG. 5 shows a first media sheet 130 bound to a second media sheet 140. The leading edge 160 thus forms a diamond like shape 330. The diamond like shape 330 may include a bonding portion 340 where the media sheets 130, 140 may meet and may be bonded via glue and the like and an expanded portion 350 for good airflow therethrough. The trailing edge 170 likewise may include the diamond like shape 330 for good air flow therethrough. Other components and other configurations may be used herein.

In use as the wetted media pad 105, the flow of water 32 may flow from the top edge 180 to the bottom edge 190 of the media sheets 125 in the fibrous media pad 120. The media sheets 125 may be fully wetted by the flow of water 32 therethrough. The inlet air flow 22 enters via the leading edge 160 and comes in contact with the flow of water 32 for heat exchange therewith. Due to the twisting and swirling airflow generated between the media sheets 125, the flow of water 32 may evaporate into the inlet air flow 22 so as to reduce the temperature of the flow of water 32 to about the inlet air wet bulb temperature. Specifically, the twisting and swirling airflows increase heat and mass transfer therethrough.

The use of the chevron like corrugated surface 200 on the first media sheet 130 helps to distribute the flow of water 32 towards the leading edge 160. The wavy corrugated surface 270 of the second media sheet 140 provides stiffness and spreads the flow of water 32 more evenly over the media depth. The use of the diamond like shape 330 at the leading edge 160 and the trailing edge 170 also serves to reduce air pressure losses therethrough. The wetted media pad 105 described herein thus may increase overall air mass flow in hot weather so as to avoid or limit overall gas turbine output reduction and performance deterioration in a simplified system.

In use as the drift eliminator 110, the fibrous media pad 120 may act as an inertial separator to remove water droplets and may direct the droplets to a drain. Alternatively, the fibrous media pad 120 may receive a hydrophilic treatment and the like. The fibrous media pad 120 as the drift eliminator 110 may be positioned downstream of the wetted media pad 105 with the air gap 115 therebetween. The air gap 115 decouples the flow/communication of the water from the media pads 120. The air gap 115 only allows water droplets that shed off of the media pad to enter the drift eliminator 110 so as to be captured, re-evaporated, or drained away. The fibrous media pad 120 may catch any water droplets carried off of the wetted media pad 105 and may absorb the water droplets through capillary action. This absorption of the water droplets into the otherwise unwetted drift eliminator material allows for additional water droplets to be evaporated into the airstream. Any water droplets not so evaporated may be directed to the drain.

This additional evaporation provides greater evaporative cooling efficiency and decreases the temperature difference across the airstream. Specifically, any local water shedding may result in a reduced local heat/mass transfer and possibly hot spots. The drift eliminator 110 allows capture of such local water shedding for uniform heat/mass transfer across the entire surface. The absorption of the water droplets into the fibrous media 120 also may enable an increase in overall airstream velocity. In other words, the drift eliminator 110 permits an increase in velocity because of the improved ability of the fibrous media pad 120 to capture any droplets.

Specifically, the use of the fibrous media pad 120 as the drift eliminator 110 downstream of the wetted media pad 105 allows for evaporation of water droplets that would otherwise be removed from the system as waste water. The fibrous media pad 120 thus increases evaporation efficiency and optimize the water consumption. The additional cooling of the airstream may reduce temperature variations across the airstream. The capture of the water droplets into the fibrous media pad 120 also allows for increased airstream velocity. The combination of the fibrous media pad 120 for the wetted media pad 105 and the drift eliminator 110 thus may eliminate the use of the thermoplastic components as the drift eliminator, reduce the depth of the filter house with a simplified construction, increase air velocity, and increase overall efficiency without the use of an additional water stream for the drift eliminator.

Although the fibrous media pad 120 may be used herein for the wetted media pad 105 and the drift eliminator 110, the size and/or configuration of the fibrous media pad 120 may vary in either role. Specifically, a fibrous media pad 120 used for the wetted media pad 105 may have a different size and/or configuration than a fibrous media pad 120 used for the drift eliminator 110. For example, the fibrous media pads 120 may have sheets of the same geometry, alternating geometry, mirror image, and the like. In addition to the chevrons and wavy portions described above, straight shapes, diagonal flutes, and the like may be used. Moreover, the wetted media pad 120 also may use conventional cellulose media materials and the like.

Figure 7:
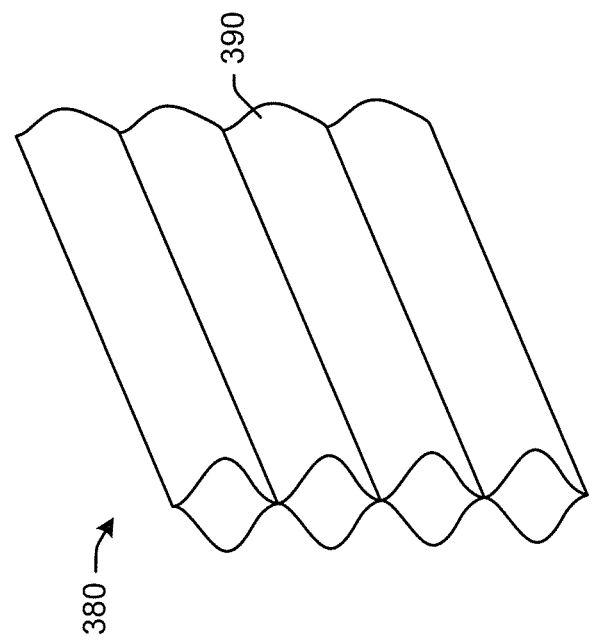
FIG. 7 is a partial perspective view of an alternative embodiment of a drift eliminator as may be described herein.
Figure 6:
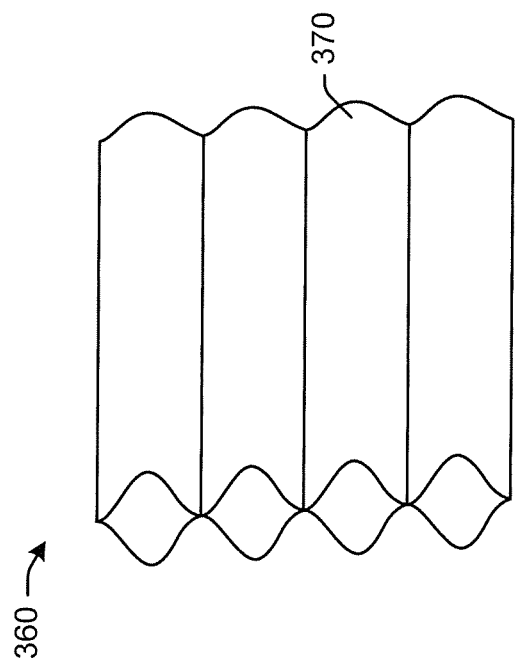
FIG. 6 is a partial perspective view of an alternative embodiment of a drift eliminator as may be described herein.
Figure 9:
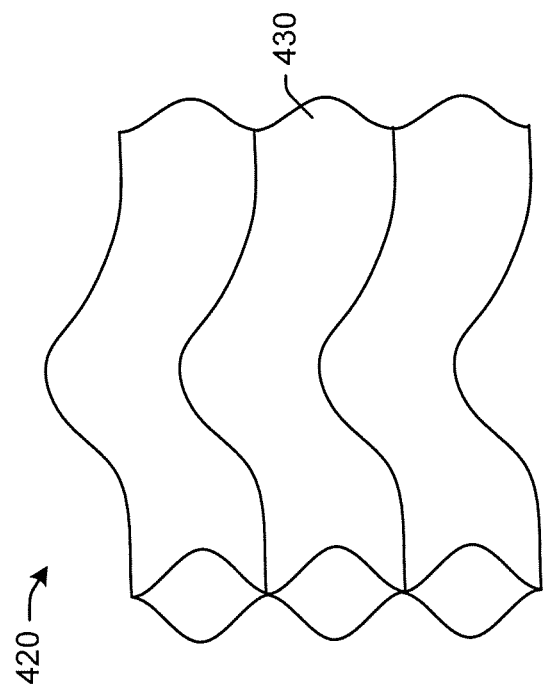
FIG. 9 is a partial perspective view of an alternative embodiment of a drift eliminator as may be described herein.
Figure 8:
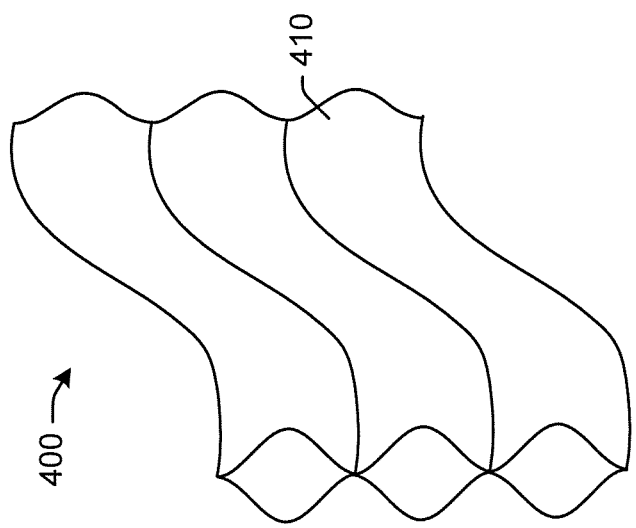
FIG. 8 is a partial perspective view of an alternative embodiment of a drift eliminator as may be described herein.

FIGS. 6-9, show different embodiments of the fibrous media pad 120 for use as the drift eliminator 110. As described above, the drift eliminator 110 may provide inertial separation or not. FIG. 6 shows a drift eliminator 360 with a number of straight flutes 370 for non-inertial separation. FIG. 7 shows a drift eliminator 380 with upward slanting flutes 390 for inertial separation. FIG. 8 shows a drift eliminator 400 with "S" shaped flutes 410 for inertial separation. FIG. 9 shows a drift eliminator 420 with inverted "U" shaped flutes 430 for inertial separation. Many different flute shapes may be used herein. Likewise, many different sizes, shapes, and configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An inlet air system for cooling an inlet air flow to a compressor of a gas turbine engine, comprising:
   a wetted media pad; and
   a drift eliminator positioned downstream of the wetted media pad with an air gap therebetween;
   the drift eliminator comprising a fibrous media pad;
   wherein the fibrous media pad comprises:
   a first media sheet;
   the first media sheet comprising a chevron corrugated surface; and
   a second media sheet;

the second media sheet comprising a wavy corrugated surface.

2. The inlet air system of claim 1, wherein the drift eliminator comprises the fibrous media pad in whole or in part.

3. The inlet air system of claim 1, wherein the wetted media pad comprises the fibrous media pad.

4. The inlet air system of claim 1, wherein the drift eliminator fibrous media pad provides inertial separation.

5. The inlet air system of claim 1, wherein the drift eliminator fibrous media pad comprises a plurality of flute shaped channels.

6. The inlet air system of claim 1, wherein the first media sheet and the second media sheet extend from a leading edge to a trailing edge.

7. The inlet air system of claim 6, wherein the leading edge faces the inlet air flow.

8. The inlet air system of claim 6, wherein the chevron corrugated surface and the wavy corrugated surface extend from the leading edge towards the trailing edge.

9. The inlet air system of claim 6, wherein the leading edge and the trailing edge comprise a diamond shape.

10. The inlet air system of claim 9, wherein the diamond shape comprises a bonding portion and an expanded portion.

11. The inlet air system of claim 1, wherein the chevron corrugated surface comprises a plurality of chevron channels with diagonally rising portions and diagonally lowering portions.

12. The inlet air system of claim 1, wherein the wavy corrugated surface comprises a plurality of wavy channels with peaks and valleys.

13. The inlet air system of claim 1, wherein the drift eliminator fibrous media pad comprises a synthetic media or a cellulose media.

14. The inlet air system of claim 1, wherein the drift eliminator fibrous media pad provides non-inertial separation.

15. An inlet air system for cooling an inlet air flow to a compressor of a gas turbine engine, comprising:
 a wetted media pad; and
 a drift eliminator positioned downstream of the wetted media pad with an air gap therebetween;
 the drift eliminator comprising a fibrous media pad in whole or in part;
 the fibrous media pad comprising a first media sheet with a plurality of chevron channels and a second media sheet with a plurality of wavy channels.

16. The inlet air system of claim 15, wherein the first media sheet and the second media sheet extend from a leading edge facing an inlet air flow to a trailing edge and wherein the leading edge and the trailing edge comprise a diamond shape.

17. The inlet air system of claim 15, wherein the plurality of chevron channels comprises diagonally rising portions and diagonally lowering portions.

18. The inlet air system of claim 15, wherein the plurality of wavy channels comprises peaks and valleys.

19. The inlet air system of claim 15, wherein the wetted media pad comprises the fibrous media pad.

\* \* \* \* \*